March 5, 1957  G. E. WHITE ET AL  2,784,402
CONTROL SYSTEMS
Filed Jan. 5, 1944
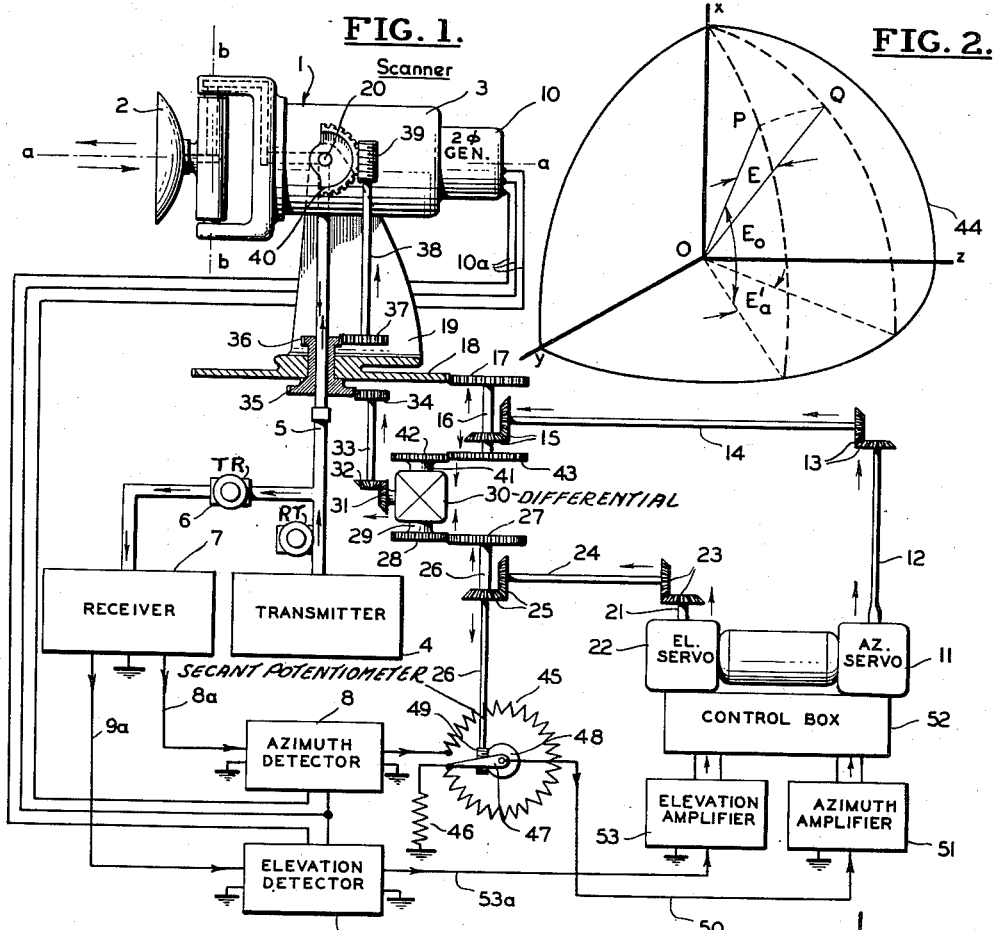
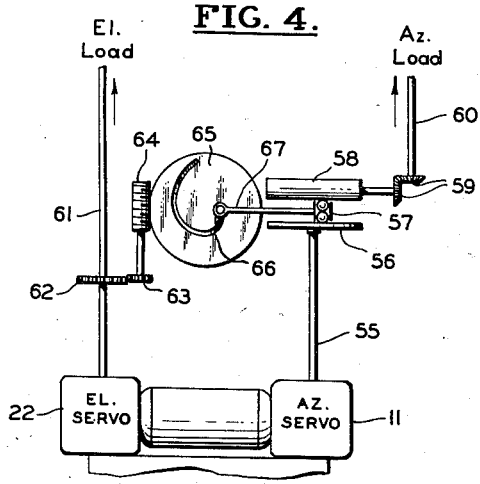
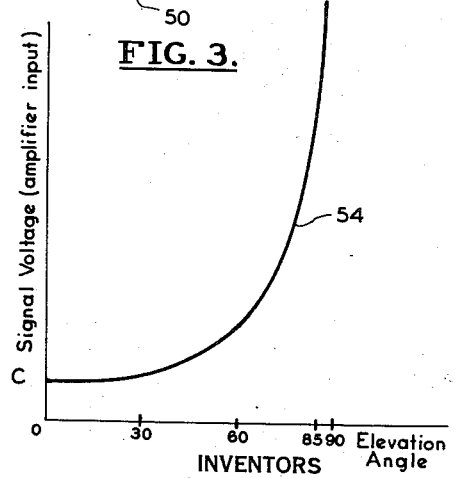
INVENTORS
G. E. WHITE
B. S. PENSYL
BY
their ATTORNEY.

2,784,402

CONTROL SYSTEMS

Gifford E. White, Hempstead, and Daniel S. Pensyl, Garden City, N. Y., assignors to The Sperry Rand Corporation, a corporation of Delaware Application January 5, 1944, Serial No. 517,008

18 Claims. (Cl. 343—117)

Our invention generally relates to a control system for controlling the movement of a positionable member and it particularly relates to a system, comprising a servomotor and signal-responsive means for controlling the operation of said motor, which system includes means for modifying the operation of the system in accordance with changes in the value of an independent variable.

Ordinarily, a servomotor system which includes a servomotor and signal-responsive means for controlling an output value of said motor, assuming the gain of the system is a constant, is controlled by an error signal which is proportional to a direct measure of the difference between the input and output values or quantities of the system. In other words, the true output value of the servomotor is ordinarily directly measured in a base or reference plane and the measurement to which the input signal is proportional is taken in said base plane. Under these conditions, and again provided the gain of the servomotor system is a constant, the system will have substantially the same operating characteristics of responsiveness and stability throughout the range of operation thereof.

The stability of the servomotor system depends, among other things, upon the sensitivity of the error-measuring means. If the sensitivity varies throughout the operating range of the servomotor system, the servomotor system will be comparatively "loose" or "sluggish" in response in one portion of its operating range, and in another portion thereof it will be unstable or "jittery." Changes in the sensitivity of the error-measuring means will be effected when the measurement to which the error signal is proportional is not taken in the base plane in which the output of the servomotor is directly measurable, that is, the sensitivity will vary where the measurement is not a true measure of the actual error, but is equal to the product of the true measure and some independent variable.

A typical example of a system or device in which the sensitivity of the error-measuring means may vary throughout the operating range of the servomotor system is a device for automatically tracking a radar signal. In the present application we have illustrated such a system for exemplary purposes and also to illustrate a preferred embodiment of our invention. It will be observed in tracking systems of this character that the error signal for controlling the operation of the servomotor is automatically obtained and no human factor is present to introduce into the system any compensation for variations or changes in the sensitivity of the error-measuring means. Furthermore, in a system of this character, the sensitivity of the error-measuring means or the magnitude of the error voltage will vary as an angular function of the true measure of the proper output value of the servomotor system for a given actual error. In a radar signal-tracking system, a scanner having a directivity axis will supply an error signal which is proportional to the measure of the angle between its directivity axis and the direction to a remote target. Since the scanner has movements about its nod and spin axes, or about vertical and horizontal axes, its directivity axis may lie in a slant plane or in a lateral plane angularly disposed with respect to the base or azimuth plane in which the output of the azimuth servomotor which drives the scanner about its vertical axis is directly measurable. The error angle measured by the scanner may be resolved into its vertical and horizontal components, but the horizontal component will be a measure of azimuth error in a slant plane and, therefore, is not a true measure of azimuth error which is directly measured in the azimuth plane but is an angular function thereof and dependent upon the angle between the slant and azimuth planes. The sensitivity of the error-measuring means therefore is not a constant, but varies as an inverse function of the secant of the elevation angle of the directivity axis of the scanner.

It is an object of our invention to provide a control system for use in devices of the foregoing character which system comprises a servomotor system, including a servomotor and signal-responsive means for controlling said motor, which control system is so constructed and arranged that its operating characteristics of responsiveness and stability are substantially constant and independent of the function or variable factor which may enter into the control measurements to which the error signal is proportional.

It is another object of our invention to provide a control system comprising a servomotor system including a servomotor and signal-responsive means for controlling said motor, signal-producing means which is controlled by the output of said servomotor and supplies to the signal-responsive means signals proportional to a function of the true measure of an output value of said servomotor, and means for modifying the operation of said servomotor system or for varying the gain thereof in accordance with the value of said function.

More particularly, it is an object of our invention to provide a control system for controlling the movements of a positionable member mounted for movement directly measurable in a base plane, wherein the error-measuring means produces a signal proportional to a displacement magnitude measured in a slant plane angularly disposed to said base plane, said system comprising a servomotor systems, including a servomotor for driving said member and signal-responsive means for controlling said motor, and means for varying the gain of said servomotor system substantially as an angular or secant function of the angle between said slant and base plane.

Another object resides in providing a control system of the foregoing character for positioning a member mounted for movement measurable by components in mutually perpendicular base and elevation planes, and in which a second servomotor is operable to move said member in elevation and in which means controlled by the output of said second servomotor is provided for modifying the operation of the other servomotor system which operates to drive said member with output values directly measurable in the base plane.

A still further object of our invention resides in the combination with a radar system including a scanning element having a directivity axis mounted for movement in slant planes angularly disposed to a base plane and the signal output of which is a measure of the angle between the directivity axis of the scanning element and the direction of the target in said slant plane, the scanning element being movable to vary the angular relationship between the slant and base planes, of a servomotor system including a servomotor, for driving said scanning element, having the true output values thereof directly measurable in said base plane, signal-responsive means for controlling the operation of said motor, and means for modifying or varying the gain of said servomotor system substantially as an angular or secant function of the angle between said slant and base plane.

With the foregoing and other objects in view, our invention includes the novel combination and correlation of elements described below and illustrated in the accompanying drawings, in which:

Fig. 1 is a somewhat schematic view of a radar signal-tracking system comprising the preferred embodiment of our invention;

Fig. 2 diagrammatically represents the relationship which may exist in a system of this character between the error signal as measured in a slant plane and the corresponding correct or true error value as measured in a base plane;

Fig. 3 illustrates a secant curve; and

Fig. 4 schematically illustrates a modification of our invention.

As hereinabove pointed out our invention relates to those types of control systems in which the error signal is automatically obtained but is modified by an independent variable or a variable external to the servomotor system itself, or in other words, to those systems in which the sensitivity of the error-measuring means varies throughout the operating range of the servomotor. It will be understood that the radar signal-tracking system herein illustrated and described is, in the broad aspects of our invention, illustrative of devices in which the signal is automatically obtained, and which is also a disclosure of a device to which our invention has particular application.

A radar signal-tracking system, as hereinbefore briefly pointed out, comprises a scanning element or scanner having directional characteristics. Reference to copending application Serial No. 438,388, filed on April 10, 1942, in the names of L. Maybarduk et al., now U. S. Patent No. 2,410,831, dated November 12, 1946, may be had for a more detailed disclosure of a radar system. Either the transmitter of ultra high frequency energy of the scanner or the receiver thereof, or both, may have directional characteristics and for descriptive purposes it will herein be assumed that the scanner comprises a transmitting and receiving antenna of a directional character. The scanner generally indicated at 1 in Fig. 1 includes a parabolic reflector 2 within which is the transmitting and receiving antenna. It will be understood, of course, that the parabolic reflector functions in conjunction with the antenna which is disposed substantially at the focus thereof to transmit radiant energy in the form of a directional beam. The reflector and its associated antenna are mounted for rotation about a spin axis a—a, the spin axis being assumed in the present case to comprise the directivity axis of the scanner. A motor 3 serves to rotate the reflector about the spin axis.

It will be assumed for purposes of explanation that the scanner of the present invention provides "conical scanning." With this type of scanning, the transmitting antenna is either mechanically or electrically displaced from the focus of the parabolic reflector so that the axis of the transmitted beam describes a cone as the scanner rotates about the spin axis a—a. Herein, it is assumed that displacement of the axis of the beam of radiant energy to position it at an angle with respect to the spin axis is attained by rotating the reflector slightly about the axis b—b, and locking it in displaced position. The axis of the reflector will therefore lie at a small angle with respect to the spin axis a—a.

A transmitter 4 of ultra high frequency energy which ordinarily is modulated with a short pulse is connected through the wave guide 5 to the radiator or transmitting antenna associated with the parabolic reflector. Since the scanner is continuously rotated about its spin axis, the beam of radiant energy will describe a cone about the spin axis a—a, and any target which appears within the scope of the cone so described or in the path of the transmitted energy will reflect energy to the antenna of the scanner. The energy so received will be transmitted through the wave guide 5 and through the T—R box 6, to a suitable receiver 7. The T—R box may be of any desired construction such as shown in copending application Serial No. 406,494, Radio Apparatus, filed August 12, 1941, J. Lyman et al., now U. S. Patent No. 2,733,437 dated January 31, 1956, and it need not be described in detail in this case. Through its function of rejecting signals of high intensity while permitting low intensity signals to pass therethrough, it will prevent energy from the transmitter to pass directly to the receiver while it will permit relatively weak, reflected energy which is picked up by the receiving antenna to pass to the receiver 7.

Preferably, a unit similar to the T—R box 6 is associated, as shown, with the wave guide 5 leading from the transmitter 4. This unit, ordinarily termed an R—T box, has a function similar to, but opposite in character to that of the box 6. In other words, the R—T box serves to pass the high intensity signal derived from the transmitter and supplied to the antenna while preventing the relatively weak reflected signals from passing to the transmitter. For a more detailed description and discussion of an R—T and T—R box, attention is invited to the article entitled "Consideration in the design of centimeter-wave radar receivers" which appears in the Proceedings of the I. R. E. for April 1947 on pages 340–351.

Herein, we have not disclosed means for positioning the scanner so that the energy beam transmitted therefrom will strike a selected target, but this may be accomplished manually or through any suitable means.

The reflected radiant energy supplied to the receiver 7 will be a measure of the error angle or the angle between the directivity axis of the scanner and the direction therefrom to the target. The receiver amplifies this error signal and in order to correct for this error and to align the directivity axis with the direction of the target, the error is resolved into its two components, that is, an azimuth and elevation error component since as hereinafter described the scanner is rotated by separate servomotors in azimuth and elevation about vertical and horizontal axes. For this purpose, the signal voltage output from the receiver 7 is supplied through conductors 8a and 9a to azimuth and elevation detectors indicated generally at 8 and 9 respectively.

In "conical scanning" systems, the strength of the reflected or received energy depends upon the position of the target or source of energy relative to the axis of the beam pattern. Since the beam pattern is rotating in a conical path, the reflected energy varies in strength as the beam pattern rotates. Thus, the envelope of the reflected energy received by the antenna varies in amplitude at a frequency corresponding to the spinning frequency of the scanner and the amplitude of the envelope depends upon the amount of displacement of the target relative to the directivity axis, that is, the spin axis of the scanner in this case. Furthermore, the phase relation of the variations in the envelope depends upon the direction of the displacement of the target relative to the directivity axis. The error signal supplied to the receiver 7 may therefore be resolved into its two components, elevation and azimuth compounds, comparing the phase relation of a signal with respect to some reference phase. A two-phase generator 10 is driven by the motor 3 which spins the scanner and comprises windings electrically displaced by 90 degrees. This generator develops voltages or reference phases corresponding to azimuth and elevation components of the direction in which the axis of the beam pattern is displaced relative to the directivity axis of the scanner at any instant. These voltages are respectively supplied to the azimuth and elevation detectors through conductors 10a and the phase of each is compared in these detectors with the phase of the variations in the envelope of the received or reflected energy. By effecting the comparison in this manner and separately with respect to what may be termed elevation and azimuth reference voltages, the azimuth and elevation components of the measured displacement may be obtained. From another viewpoint the reference voltages derived from generator 10 may be considered as being supplied to the azimuth and elevation detectors to multiply therein the received energy by sine and cosine functions of the angular positions of the axis of the beam pattern whereby to obtain azimuth and elevation components of the error signal.

These elevation and azimuth components of the received error signal are employed respectively to control the operation of elevation and azimuth servomotors. The azimuth servomotor is arranged to locate the scanner about the vertical axis in azimuth, in accordance with the azimuth error, while the elevation servomotor is designed to move the scanner in elevation about a horizontal axis, whereby to correct for the elevation error. As herein illustrated, the azimuth servomotor 11 has its output shaft 12 connected through bevel gears 13, shaft 14 and bevel gears 15 to shaft 16. The shaft 16 drives gear 17 which meshes with gear 18 secured to the support 19 for the scanner 1. It will be understood that the support 19 is mounted for rotation in azimuth in any suitable manner (not shown). Rotation of the support 19 about a vertical axis which is preferably coincident with the axis of wave guide 5 affects azimuthal rotation of the scanner 1, the scanner being pivotally supported thereon as indicated at 20 for movement relative thereto in elevation.

The elevation servomotor functions to rotate the scanner about its axis of pivotal support 20 on the support 19. The output shaft 21 of the elevation servomotor 22 is connected through bevel gears 23, shaft 24 and bevel gears 25 to shaft 26. Shaft 26 through gears 27 and 28 drives the input shaft 29 of a differential 30. The output 31 of the differential drives bevel gears 32, shaft 33 and gear 34 which meshes with gear 35 mounted coaxially with the azimuth axis of the support 19. Gear 35 may be secured to gear 36 or may be made integral therewith, and these gears rotate as a unit relative to the support 19. Gear 36 meshes with gear 37 and drives shaft 38 carrying a worm 39. Worm 39 meshes with sector wheel 40 which is secured to the scanner 1 and serves to rotate it in elevation about its axis 20.

With the arrangement above described, it will be noted that unless some compensating means is provided, rotation of the support and scanner about its vertical azimuth axis while the gears 35 and 36 are held stationary by the elevation servomotor, will cause shaft 38 and gear 37 to move about the axis of gears 35 and 36, thereby causing shaft 38 to rotate and move the scanner in elevation. To compensate therefor, the differential 30 is interposed in the transmission between the elevation servomotor and the gears 35 and 36. A second input 41 of differential 30 is connected through gears 42 and 43 with shaft 16 constituting an element of the transmission of the azimuth servomotor. The differential 30 is so arranged and the gear ratios so designed that when the azimuth servomotor operates to move the scanner in azimuth about its vertical axis, the azimuth servomotor will drive the input 41 to the differential 30 thereby causing the gears 35 and 36 to rotate in synchronism with the support 19. Therefore, when the azimuth servomotor alone is driving the scanner, azimuth motion only of the scanner will be obtained and no vertical or elevation motion will be imparted thereto.

Referring now to Fig. 2, assume that the scanner is at the point O and that the position of its directivity axis is represented by the line OP, point P being the intersection of the line with the surface of the spherical sector indicated generally at 44. Further, let us assume that the target lies at the point Q. The received signal from the scanner resolved in its elevation and azimuth components will supply an azimuth error signal which is measured in the slant plane including the lines OP and OQ and therefore will be proportional to the measure of the angle E. The azimuth servomotor, however, will drive the scanner about the vertical axis O—X, and the true measure of the output value of the servomotor is directly measurable only in the azimuth plane Y—O—Z. It will be observed from an examination of Fig. 2 that the angle through which the scanner must be driven in azimuth as measured by the angle $E'_a$, in the azimuth plane, does not equal but is greater than the error angle measured in the slant plane or angle E. Furthermore, it will be observed that as the angle between the slant and azimuth or base planes decreases, the difference in magnitude of these angles also decreases. In other words, the angle E is equal to the angle $E'_a$ multiplied by the cosine of the elevation angle $E_o$.

For example, if the angle $E_o$ equals 0, the secant will be unity, and, of course, the azimuth error angle as measured by the scanner and supplied to the control amplifier for the azimuth servomotor, will be a true and direct measure of the error value which is to be reduced to zero by the output of the azimuth servomotor. However, as the elevation angle $E_o$ increases, the azimuth error signal derived from the scanner will proportionally decrease or will be equal to the true measure of the output value of the azimuth servomotor times the cosine or the reciprocal of the secant of the angle of elevation. In other words, if the directivity axis of the scanner lies in the azimuth plane, proper control may be exercised over the azimuth servomotor at all times to provide the desired responsiveness and stability of the servomotor system. However, for the same actual error measured in the azimuth plane, but with the directivity axis of the scanner lying in a slant plane, the measured error is smaller than it should be to exercise proper control over the servomotor, or the sensitivity of the error-measuring means may be considered less than it would be when measuring in the azimuth plane. Since the sensitivity of the error-measuring means varies inversely as a secant function of the elevation angle, we propose to modify the operation of the servomotor system or to control the gain thereof so that the output value of the servomotor will be substantially the same for a given, true azimuth error, regardless of whether the azimuth error is measured in the azimuth plane or in any slant plane angularly disposed thereto. Since the secant of an angle approaches infinity as the angle approaches 90 degrees, we cannot modify the operation of a servomotor system in accordance with the secant of an angle throughout a range of from 0 to 90°, but only within a practical range of from 0 to about 85°. This range is sufficient for all practical purposes in scanning devices.

In the drawings, we have shown the preferred manner in which to vary the gain of the azimuth servomotor system in accordance with the secant of the angle of elevation of the directivity axis of the scanner above the azimuth plane. In the embodiment illustrated, the output voltage of the azimuth detector 8 is connected to one end of a secant potentiometer 45, the other end of which is connected through resistor 46 to ground. It will be understood that a secant potentiometer is a resistor so wound that the voltage output obtained therefrom by means of a wiper varies approximately as the secant of the voltage impressed across the potentiometer between some fractional part of said impressed voltage and the full value thereof. In other words, the position of the wiper being a measure of an angle, the voltage picked off the potentiometer will equal the product of the voltage impressed across resistor 46 and the secant function of the angle.

In the present invention the resistor 46 is connected in series with potentiometer 45 so that when the elevation angle equals zero, the voltage appearing across resistor 46 will be supplied to the azimuth amplifier, and will equal the voltage output of the azimuth detector multiplied by some constant, a fraction. Therefore, the input to the azimuth amplifier of the servomotor system will vary as the secant of the angle of elevation above the value represented by the voltage across resistor 46. The wiper arm 47 of the potentiometer is driven by means of worm wheel 48, which is driven by worm 49 connected to rotate with the shaft 26 driven by the elevation servomotor. For zero elevation angle, the wiper will occupy the position illustrated in Fig. 1, and as the elevation servomotor drives the scanner in elevation, it will also rotate the wiper arm 47 along the secant potentiometer until the upper limit or the opposite end of the potentiometer is reached corresponding to an elevation angle of approximately 85 degrees.

The ouput voltage from the potentiometer 45 is fed through the conductor 50 to the signal voltage-responsive means or amplifier 51 of the azimuth servomotor system. The amplifier may be of any well-known type preferably having a constant gain and the output thereof is supplied to a control box 52 which comprises means for controlling the operation of the azimuth servomotor 11. For example, the servomotor may be of the well-known Vickers type and the control box may include a torque motor responsive to the output of the amplifier and a stroke valve and stroke piston for controlling the rate and magnitude of the displacement of the output of the servomotor. Similarly, the signal output from detector 9 is fed through conductor 53a to the elevation servomotor amplifier 53, the output of which is supplied to the control box and mechanism similar to those above described for controlling the output of the elevation servomotor.

An examination of Fig. 1 in connection with Fig. 3 will disclose the manner in which the signal voltage from the azimuth detector is modified to provide an input to the servomotor amplifier of the correct character. With zero degree elevation of the directivity axis of the scanner with respect to the base or azimuth plane, the wiper 47 of the potentiometer will occupy the position shown in Fig. 1 which on the curve 54 of Fig. 3 corresponds to the point C. In this position of the scanner axis, a signal voltage will be supplied to the azimuth amplifier which is a fractional part of the output signal from the azimuth detector, and the magnitude of the signal supplied to the amplifier will provide the correct and desired degree of responsiveness and stability in the servomotor system. As the elevation servo drives the scanner to position its directivity axis at some angle to the base or azimuth plane, the wiper 47 will correspondingly move along the potentiometer and the voltage supplied therefrom to the azimuth servomotor amplifier will vary as graphically illustrated by the curve 54 and the value of the voltage may be determined for any elevation angle between the limits hereinabove pointed out along the ordinate of the graph. In operation, therefore, the operation of the azimuth servomotor is modified in accordance with the value of the secant function of the elevation angle or the angle between the slant plane including the directivity axis of the scanner and the azimuth plane.

It will be understood that the servomotor system herein described, in the broad sense of the term, includes the azimuth servomotor amplifier, and the potentiometer 45 and resistor 46. In other words, the servomotor system is inclusive of all elements between the azimuth detector unit and the load driven by the servomotor. By means of the potentiometer, the gain of the servomotor system is in effect varied in accordance with the independent variable or the secant value of the elevation angle. The output of the azimuth detector may be supplied directly to the amplifier which controls the azimuth servomotor and the gain of the amplifier itself may be controlled as a secant function of the elevation angle or a function of any other variable which affects the sensitivity of the error-measuring means.

A modification of our invention is illustrated in Fig. 4 wherein we modify the operation of the servomotor system or vary the gain thereof by interposing a variable speed drive between the azimuth servomotor and the load. In this embodiment of our invention, it is assumed that the signal voltage derived from the azimuth detector is supplied directly to the azimuth amplifier which in turn controls the output of the servomotor. Instead of connecting the output of the servomotor directly with the load or support 19 to provide a fixed speed transmission therebetween, we connect the output shaft 55 of the azimuth servomotor 11 with a disc 56. A ball carriage 57 cooperates with the disc to drive a cylinder 58 which, in turn, through bevel gears 59 drives the azimuth load shaft 60. Although not illustrated, it is to be understood that shaft 60 is connected through suitable gears to drive the load or support 19 in azimuth. The elevation servomotor output shaft 61 drives a gear 62 meshing with gear 63, and gear 63 through worm 64 and worm wheel meshing therewith serves to rotate cam 65 comprising cam slot 66 which approximately constitutes a secant cam. In other words, the angular position of cam 65 corresponds to the angular elevation of the slant plane or the directivity axis of the scanner above the azimuth plane and since the cam slot has a secant characteristic, the rod 67, which has a cam follower at one end thereof engaging within the cam slot 66 and is connected to the ball carriage 57 at the other end thereof, will serve to position the ball carriage in a position corresponding to the elevation angle of the directivity axis. Therefore, the output rate of the azimuth servomotor will be varied through the medium of the variable speed drive as a secant function of the angle of elevation of said directivity axis. Under these conditions, although the azimuth component of the error angle is measured in a slant plane, the rate of the servomotor output will be correspondingly modified or increased in proportion to the magnitude of the elevation angle and the loss in sensitivity of the error-measuring means will be compensated for in such a manner that the operating characteristics of the servomotor system will be substantially the same throughout the elevation angle range as if the error-measuring means had provided a true measure of the error in the azimuth plane.

It is to be understood from the foregoing that the term "servomotor system" as employed herein and in the appended claims in its broadest sense is intended to cover systems wherein the error signal is modified in accordance with a variable or a function of variable either before its introduction to the signal amplifier, or in which the error signal, proportional to the measured error, is supplied directly to the amplifier and the gain of the amplifier is varied in accordance with the variable, and also to those systems wherein modification of the operation of the servomotor system is effected between the servomotor and its load. Furthermore, by the term "direct measurement" we mean to indicate a true measurement and not one which is an indirect measurement or a function of the true measurement of a value; and the output value of the servomotor may comprise values in displacement, rate or other terms (such as acceleration and higher derivatives), and the original error signal though proportional to a displacement term may control the rate and displacement of the servomotor.

Hence, while we have described our invention in its preferred embodiments, it is to be understood that the words which we have used are words of description rather than of limitation and the changes within the purview of the appended claims may be made without departing from the true scope and spirit of our invention in its broader aspects.

What is claimed is:

1. A control system for controlling the movement of a positionable member comprising a servomotor system including a servomotor connected to drive said member and signal-responsive means for controlling said motor, signal-producing means controlled by the output of said servomotor for supplying to said signal-responsive means signals dependent upon a primary variable magnitude to which an output value of said motor is to correspond, means for varying the magnitude of said signals as an angular function of a second variable magnitude independent of said primary variable, and means for continuously modifying the operation of said servomotor system in accordance with the reciprocal of the value of said angular function.

2. A control system for controlling the movement of a positionable member comprising a servomotor system including a servomotor connected to drive said member and signal-responsive means for controlling said motor, signal-producing means controlled by the output of said servomotor for supplying to said signal-responsive means signals dependent upon a primary variable magnitude to which an output value of said motor is to correspond, means for varying the magnitude of said signals as an angular function of a second variable magnitude independent of said primary variable, and means for continuously controlling the gain of said servomotor system substantially in accordance with the reciprocal of the value of said angular function.

3. In a control system of the character described, a positionable member mounted for movement directly measurable in a base plane, a servomotor system comprising a servomotor for driving said member and a signal-responsive means for controlling said motor, means operable in a slant plane angularly disposed to said base plane for producing a signal proportional to the projection of a measure of a desired output value of said servomotor projected from said base plane into said slant plane, and means for continuously controlling the gain of said servomotor system as a function of the angle between said slant and base planes.

4. In a control system of the character described, a positionable member mounted for movement directly measurable in a base plane, a servomotor system comprising a servomotor for driving said member and a signal voltage-responsive means for controlling said motor, means for producing a signal voltage proportional to a displacement magnitude measured in a slant plane angularly disposed to said base plane, means for varying the angular relationship between said slant and base planes, and means for varying the gain of said servomotor system substantially as a secant function of the angle between said slant and base planes.

5. In a control system of the character described, a positionable member mounted for movement directly measurable in a base plane, a servomotor system including a servomotor for driving said member and a signal-responsive means for controlling said motor, means for measuring a quantity in slant planes angularly disposed to said base plane and for supplying signals to said signal-responsive means proportional to the measured quantity, said signals controlling said motor, means for varying the angular relationship between said slant and base planes, and means controlled by said last mentioned means for continuously controlling the gain of said servomotor systems as a function of the angle between said planes.

6. In a control system for controlling the movement of a positionable member, a servomotor connected to drive said member, signal-producing means controlled by the output of said servomotor for producing a signal voltage as a measure of a primary variable magnitude to control an output value of said servomotor, control means for said servomotor comprising signal amplifying means connected to receive said signal voltage, means operatively connected with said signal producing means for varying the relationship of its signal output to the primary variable as a function of a second variable quantity unrelated to said primary variable and means for deriving a minimum, fractional voltage component of said produced signal voltage and for varying the magnitude thereof in accordance with the value of said function from and above said minimum value, said modified signal being supplied to said amplifying means.

7. In a control system for controlling the movement of a positionable member, a servomotor connected to drive said member, signal-producing means controlled by the output of said servomotor for producing a signal voltage dependent in magnitude upon a primary variable quantity to control an output value of said servomotor, resistance means including a potentiometer having said signal voltage impressed thereacross, signal voltage amplifying means connected to receive the output of said potentiometer and having its output connected to control said servomotor, means for varying the magnitude of said signal voltage as a function of a second variable quantity unrelated to said primary variable, and means for positioning the potentiometer output setting inversely in accordance with a value of said second variable.

8. In a control system of the character described, a positionable member mounted for movement directly measurable in a base plane, a servomotor system comprising a servomotor for driving said member and a signal voltage-responsive means for controlling said motor, means for measuring a displacement magnitude in a slant plane angularly disposed to said base plane and for producing a signal voltage proportional thereto, and means for modifying the signal voltage so produced and for varying the magnitude thereof inversely in accordance with the magnitude of the angle between said slant and base planes, said modified signal being supplied to said voltage-responsive means.

9. In a control system of the character described, a positionable member mounted for movement directly measurable in a base plane, a servomotor system comprising a servomotor for driving said member and a signal voltage-responsive means for controlling said motor, means for measuring a displacement magnitude in a slant plane angularly disposed to said base plane and for producing a signal voltage proportional thereto, resistance means including a secant potentiometer having signal voltage impressed thereacross, the output of said potentiometer being connected to said voltage-responsive means, and means for varying the potentiometer output setting in accordance with changes in the magnitude of the angle between said slant and base planes.

10. In a control system of the character described, a positionable member mounted for movement directly measurable in a base plane a servomotor system comprising a servomotor for driving said member and a signal voltage-responsive means for controlling the rate of operation of the output of said servomotor, means for measuring a displacement magnitude in a slant plane angularly disposed to said base plane and for producing a signal voltage proportional thereto, and variable transmission means for modifying the rate of the servomotor output in accordance with a function of the angle between said slant and base planes.

11. In a control system, a positionable member mounted for movement measurable by components in mutually perpendicular, base and elevation planes, a first servomotor system including a first servomotor connected to drive said member and signal responsive means for controlling said servomotor, one of said components being a true measure of the output of said system, a second servomotor system including a second servomotor connected to drive said member, the other of said components being a true measure of the output of said second servomotor, signal-producing means movable with said member for supplying control signals to the signal-responsive means of said first servomotor system, and means controlled by the output of said second servomotor for continuously modifying the operation of said first servomotor system.

12. The combination with a radar system including a directivity axis-defining element mounted for movement in a slant plane angularly disposed to a base plane and means for producing a signal voltage proportional to the angle between said directivity axis and the direction of a target as measured in said slant plane, of a servomotor system including a servomotor connected to drive said element and having the output value thereof directly measurable in said base plane and a signal voltage-responsive means for controlling said servomotor, and means for varying the gain of said servomotor system substantially as a function of the angle between said slant and base planes.

13. The combination with a radar system including scanning element having a directional antenna and a directivity axis mounted for movement in a slant plane angularly disposed to a base plane and a high frequency energy receiver having its input coupled with said antenna and adapted to supply a signal voltage output proportional to the angle between said directivity axis and the direction of a target as measured in said slant plane, of a servomotor system including a servomotor connected to drive said element and a signal voltage-responsive means for controlling said servomotor, the output of said receiver being supplied to said voltage-responsive means, and means for modifying the operation of said servomotor system substantially as a secant function of the angle between said slant and base planes.

14. The combination with a radar system including a scanning element having a directional antenna and a directivity axis mounted for rotation about substantially mutually perpendicular axes, a first thereof being normal to a base plane, and a high frequency energy receiver having its input coupled with said antenna and adapted to supply a signal voltage output proportional to the angle between said directivity axis and the direction of a target as measured in a slant plane angularly disposed to said base plane, of a first servomotor system including a first servomotor for rotating said antenna about said first axis and signal-responsive means for controlling said servomotor, a second servomotor for rotating said antenna about the second of said axes, the output of said receiver being supplied to said signal-responsive means, and means operated by said second servomotor for varying the gain of said first servomotor system substantially as a secant function of the angle between said slant and base planes.

15. In a control system of the character described, a positionable member mounted for movement directly measurable in a base plane, a servomotor system comprising a servomotor for driving said member and signal responsive means for controlling said motor, means for measuring a displacement magnitude in a slant plane angularly disposed to said base plane and for producing a signal proportional thereto, said positionable member being angularly movable relative to said base plane whereby the angle between said slant and base planes may be varied, and means for controlling the gain of said servomotor system as a secant function of the angle between the slant and base planes.

16. A servomotor system for controlling the rate of operation of a servomotor included therein wherein the magnitude of a change in a first variable varies in accordance with a second variable with respect to the rate of operation of a servomotor output required to zero a signal derived from a signal generator measuring said change, said system comprising a servomotor having an output, motor-control means for controlling the rate of operation of said servomotor, signal generator means for producing a signal in accordance with said first variable, said signal generating means being driven from the output of said servomotor, means for supplying the output of said signal generator to said motor-controlling means to drive the motor in a direction and at a rate to reduce the signal generator output toward zero, means varying the response of the servomotor system in accordance with said second variable, and means for modifying the rate of operation of said servomotor system as an inverse function of said second variable whereby to render the response of said servomotor system substantially unaffected by said second variable.

17. A servomotor system for controlling the movement of a positionable member wherein the magnitude of a change in a first variable as a measure of a desired movement of said member varies in accordance with a second variable with respect to the magnitude of a servomotor output controlling a movement of said member which is required to zero a signal derived from a signal generator carried by said member for measuring said change, said servomotor system comprising a servomotor having an output connected to drive said member, a motor-control means for controlling said servomotor, signal generator means including means carried by said member for producing an error signal in accordance with changes in said first variable, means for supplying the output of said signal generator means to said motor-controlling means for controlling said servomotor such that said member is moved in a direction to reduce the signal generator output toward zero, means connected with said member and moving the same in accordance with said second variable, said second variable varying the response of the servomotor system moving said member in accordance with said first variable, and means for varying the response of said servomotor system as an inverse function of said second variable whereby to render the response of said servomotor system and the resulting movement of said member substantially unaffected by said second variable.

18. A servomotor system wherein the magnitude of of a change in a first variable varies in accordance with a second variable with respect to the magnitude of a servomotor output required to zero a signal derived from a signal generator measuring said change, said servomotor system comprising a servomotor, motor-control means for controlling said servomotor, a signal generating means for producing an error signal in accordance with changes in said first variable, said signal generating means being driven from the output of said servomotor, means for supplying the output of said signal generating means to said motor-controlling means to drive the motor in a direction to reduce the signal generator output toward zero, means varying the response of the servomotor system in accordance with said second variable, and means coupled with said last-mentioned means for continuously varying the magnitude of the error signal supplied to said motor-control means as an inverse function of said second variable whereby to render the response of said servomotor system substantially unaffected by said second variable.

References Cited in the file of this patent

UNITED STATES PATENTS

| | | |
|---|---|---|
| 2,025,749 | Hubbard | Dec. 31, 1935 |
| 2,138,966 | Hafner | Dec. 6, 1938 |
| 2,308,521 | Lear | Jan. 19, 1943 |
| 2,314,029 | Bond et al. | Mar. 16, 1943 |
| 2,314,937 | Hannon | Mar. 30, 1943 |
| 2,336,492 | MacKay | Dec. 14, 1943 |
| 2,387,795 | Isserstedt | Oct. 30, 1945 |
| 2,412,612 | Godet | Dec. 17, 1946 |
| 2,416,562 | Alexanderson | Feb. 25, 1947 |
| 2,450,084 | Emerson | Sept. 28, 1948 |

FOREIGN PATENTS

| | | |
|---|---|---|
| 489,208 | Great Britain | July 21, 1938 |